United States Patent

[11] 3,574,293

| [72] | Inventor | Joseph A. Vriend<br>Box 505, Squamish, British Columbia, Canada |
|---|---|---|
| [21] | Appl. No. | 773,459 |
| [22] | Filed | Nov. 5, 1968 |
| [45] | Patented | Apr. 13, 1971 |

[54] ANTIKNOCK BEARING DEVICE
3 Claims, 5 Drawing Figs.

[52] U.S. Cl. .................................................. 92/84,
92/187, 92/249, 92/256
[51] Int. Cl. ...................................................... F16j 1/16
[50] Field of Search ........................................... 92/84,
187—191, 212, 238, 248, 249, 256; 123/197
(A1), (AL), 193 (P)

[56] References Cited
UNITED STATES PATENTS

| 653,482 | 7/1900 | Morgan ........................ | 92/187 |
| 1,221,419 | 4/1917 | Clark............................ | 92/190X |

FOREIGN PATENTS

| 1,249,660 | 11/1960 | France ......................... | 92/84 |
| 1,282,052 | 12/1961 | France ......................... | 92/249 |
| 130,957 | 2/1951 | Sweden ........................ | 92/84 |

*Primary Examiner*—Martin P. Schwadron
*Assistant Examiner*—Irwin C. Cohen
*Attorney*—Fetherstonhaugh and Co.

ABSTRACT: A device having normally concentric sleeves and a resilient insert nonrotatably mounted between the sleeves, the sleeves having end flanges shaped to restrict and limit relative radial movement of the sleeves to compress and release the insert.

PATENTED APR 13 1971  3,574,293
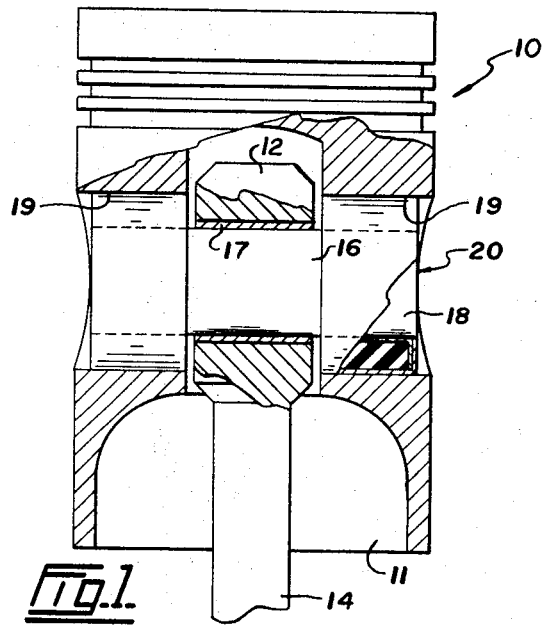
Fig.1.
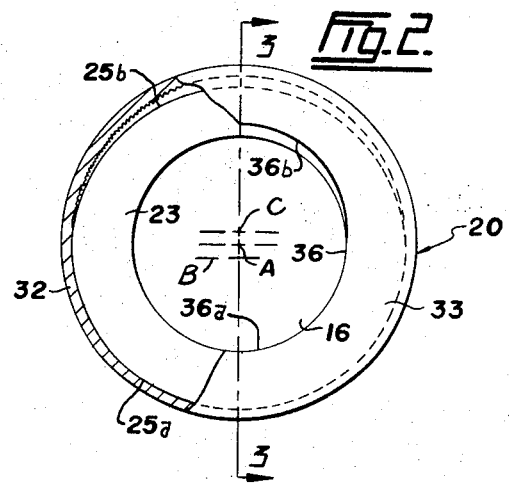
Fig.2.
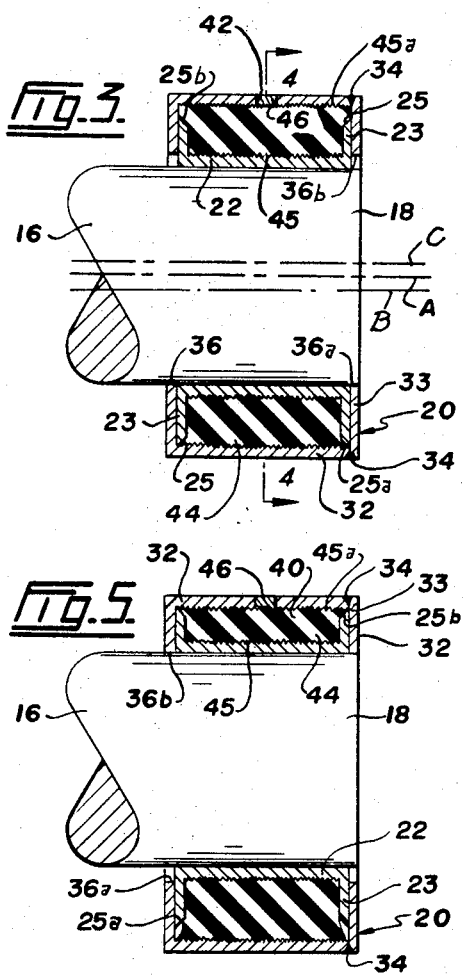
Fig.3.
Fig.5.
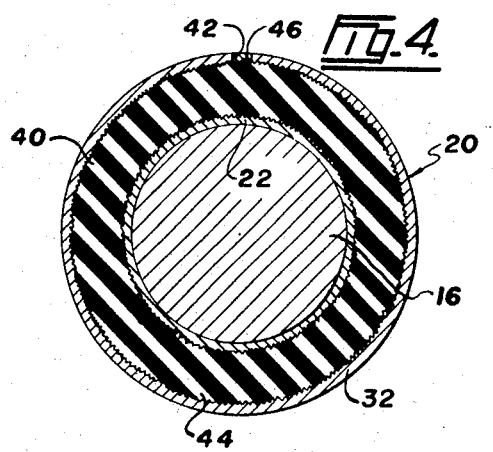
Fig.4.
INVENTOR
JOSEPH A. VRIEND
BY
Fetherstonhaugh & Co
ATTORNEYS

ANTIKNOCK BEARING DEVICE

BACKGROUND OF THE INVENTION

This invention relates to a device adapted to be incorporated in a bearing assembly of an internal combustion engine and particularly a diesel engine.

Diesel engines, and particularly those of the direct injection type, are especially prone to what has become known as diesel knock or detonation. When a fuel charge is injected directly into a combustion chamber and is ignited by heat of compression, there is a very rapid pressure increase causing a metalliclike knocking which is so characteristic of diesel engines. Attempts have been made to overcome this, for example, by the use of precombustion chambers or by using improved and more costly fuels but this is not a satisfactory answer to the problem. The trend today is towards high-speed diesels with a favorable horsepower-weight ratio with the result that knocking is more likely to occur than ever.

The use of resilient bearing assemblies as a possible solution to this and related problems has been suggested before but such assemblies known to the applicant are not particularly effective and even have a number of disadvantages which prevent them from being used to lessen the undesirable effects of engine knock. For example, most rubber bushings and the like will allow two rotatably connected parts to move relative to one another in any direction and limited only by the amount of resilience in the rubber bushing. Such unrestricted movement in a bearing assembly can cause excessive vibration and wear of engine parts and seriously interfere with the proper timing and smooth operation of an internal combustion proper timing and smooth operation of an internal combustion engine.

SUMMARY OF THE INVENTION

The present invention overcomes the disadvantages of known resilient bushings by providing a device which conveniently can be mounted between a piston and a wristpin connecting a rod to said piston. The device will allow the piston to move a limited short distance relative to the wristpin thus absorbing a great deal of the shock resulting from the explosion of the fuel mixture and thus greatly reducing the sound or knock of the explosive force. At the same time, the device confines the movement of the wristpin and therefore the connecting rod so that these engine parts are not free to move in an uncontrolled and undesirable manner. The resilient member has a predetermined high resistance to radial compression so that no appreciable relative movement between the piston and wristpin takes place during the compression stroke of the engine. And finally, the resilient member is compressed axially by confining portions of the device to further cushion the shock of metal contacting metal.

BRIEF DESCRIPTION OF THE DRAWINGS

FIG. 1 is a part section, part side elevation, of the device mounted in a preferred position of use;

FIG. 2 is an enlarged end elevation, part in section, of the device only;

FIG. 3 is a section taken on the line 3-3 of FIG. 2;

FIG. 4 is a section taken on line 4-4 of FIG. 3; and

FIG. 5 is a section similar to FIG. 3 but showing the resilient insert fully compressed.

DESCRIPTION OF THE PREFERRED EMBODIMENT

Referring first to FIG. 1 of the drawings, the numeral 10 indicates generally a typical piston for a diesel engine. Piston 10 has a central recess 11 into which the small end 12 of a rod 14 projects. A piston pin 16 is rotatably mounted in a bushing 17 carried within the connecting rod end 12 and the opposite ends 18 of this piston pin 16 project into aligned openings 19 formed in the piston so as to communicate with the central recess 11.

The opposite ends 18 of the piston pin 16 are each fitted with an antiknock bearing device generally indicated at 20. Referring now particularly to FIGS. 2 to 5 of the drawing, each device 20 is shown to comprise an inner sleeve 22 having an outwardly directed flange 23 at each opposite end thereof. Flanges 23 have outer end edges 25 which are beveled so as to slope inwardly towards the center of the sleeve. The end edges 25 have lower portions 25a which are concentric to the sleeve, see particularly FIG. 2. In other words, the semicircular portions 25a are radiused about point A of FIGS. 2 and 3, which point is on the longitudinal axes of both the inner sleeve 22 and the piston pin 16. The remainder of edges 25 are shaped to provide upper portions 25b which are eccentric to the sleeve and are radiused about a point B, see also FIGS. 2 and 3.

Sleeve 22 is mounted within an outer sleeve 32 having, at each opposite end, an inwardly directed flange 33. One of the flanges 33 can be secured to the sleeve 32 by welding as at 34 to facilitate assembly of the device. Flanges 33 have inner end edges 36 which are parallel to the longitudinal axis of the outer sleeve. Normally, this longitudinal axis of sleeve 32 is centered on the axis A of sleeve 22 and therefore the outer sleeve axis is designated by the same reference letter in FIG. 2. Lower portions 36a of the flanges 33 are semicircular and concentric to the axis A as shown in FIG. 2 while the upper portions 36b are eccentric thereto or are radiused about axis C.

The normally concentric sleeves 22 and 32 and their end flanges 23 and 33 define an annular space 40 and the outer sleeve is provided with an opening 42 which communicates with this space. Space 40 is occupied by a resilient insert 44 which is injected through the opening 42 while in a fluid state. When the rubberlike material has hardened within the space 40, it adheres or bonds to the sleeve 22 and 32 so that said sleeves cannot be rotated relative to one another to any appreciable extent. To further ensure that relative rotation of the parts of the device cannot take place, the outer surface of sleeve 22 and the inner surface of sleeve 32 preferably are knurled or otherwise serrated as indicated at 45 and 45a respectively. A plug 46 is used to seal the opening 42 after the insert 44 has been poured. Preferably, one of a number of suitable plastics is used to form the insert 44 and included amongst the requirements of the selected plastic are a high degree of resistance to compression and the ability to store and later release energy once the force compressing the material falls below a predetermined level. If desired, the insert may comprise an annular metal spring (not shown) of suitable wavelike form which would be mounted between the sleeves during assembly in which case no opening 42 or plug therefor would be required. Like a rubber or plastic insert, such a spring would yield during the power stroke of the engine but would be sufficiently strong to resist compressive forces applied thereto during the compression stroke of the engine.

The two devices 20 as illustrated are a press-fit on the ends 18 of the piston pin 16 and also within the openings 19 of the piston. Thus, the sleeves 22 and 32 do not rotate with respect to the pin 16 and piston 10 while the connecting rod 14 has limited swinging movement about the piston pin bushing 17. Alternatively, the pin 16 can be free floating within the sleeves 22 in which case conventional split rings or the like (not shown) would be used to secure said pin against endwise movement.

When the piston 10 is at top dead center and the rod 14 is vertical, the portions 25b and 36b are directly over the piston pin 16. The sleeve 32 can then move a short distance axially towards the sleeve 22 to compress the insert 44. Thus, it will be seen that the end flanges of the sleeves 22 and 32 are shaped to provide guide means whereby relative radial movement of said sleeves is restricted to movement along one path of travel only. In other words the small end 12 of the connecting rod is not free to move from side to side but can only move up and down along the vertical axis of the piston 10.

Assuming the invention is installed as above described in a direct injection diesel engine, the device will function as follows. As the explosive charge of diesel fuel ignites, a downward force is exerted on the piston 10 and this force is transmitted to the outer sleeve 32. The connecting rod 14 resists this downward force and the sleeves 22 and 32 are moved radially towards one another to compress the resilient inserts 44. This slight radial movement of the outer sleeve 32, which preferably is only a fraction of an inch, is sufficient to remove or at least greatly decrease the knocking which normally can be heard in a diesel engine, particularly one operating under load. Movement of the sleeves to compress the resilient insert is halted when the portions 25b contact the inner surface 45a of the outer sleeve 32 and the piston pin 16 contacts the portions 36b.

The insert 44 is compressed by the maximum force of the explosion but as the piston 10 descends in the cylinder, and the fuel continues to burn, the explosive force decreases to a point where the resilient insert can expand and force the two sleeves apart to their normal concentric relationship. Thus, insert 44 stores energy and, at an appropriate moment, releases the stored energy to the piston-connecting rod assembly for transmission to the engine crankshaft.

It will be noted that, the piston 10 ascends in the cylinder during the compression stroke, the insert 44 is not compressed to any extent since it is capable of resisting this smaller compressive force. Thus, there is no decrease in the length of the compression stroke or reduction in compression ratio as a result of use of the present invention. Also, it should be noted that the resilient insert is fully enclosed within the sleeves 22 and 32 and their end flanges 23 and 33 so that the rubberlike material forming the insert cannot be extruded during compression.

As the sleeves 22 and 32 of each device 20 move radially to compress and release the insert 44, the beveled edges 25 of the inner sleeve compress the resilient insert longitudinally and this serves to cushion the blow which occurs when the sleeves reach the end of their travel and metal contact occurs. Further radial movement of the sleeves to compress the insert 44 is halted when the portions 25b strikes the inner surface 45a of the sleeve 32 and the pin 16 contacts the portions 36b. Movement of the sleeves of each device 20 in a reverse direction to release the insert 44 is halted when the portions 25a contact the inner surface 45a of the sleeve 32 and the wristpin 16 engages the flange portions 36 of the outer sleeve. The end edges of the flanges 23 and 33 are suitably hardened to take this metal-to-metal contact without being damaged thereby, the contact being largely cushioned or dampened by the resilient insert.

The present invention has been described as used on a diesel engine but it will be appreciated the device will serve equally as well on a normal gasoline engine to lessen the effect of detonation which causes a similar hammering sound. Thus, lower grade fuel can be used when a gasoline engine is fitted with the antiknock device and the ignition timing can be advanced for greater efficiency. Also, it will be appreciated that two devices do not have to be fitted to opposite ends of the wristpin 16 as shown. A single device can be interposed between the bushing 17 and the small end 12 of the connecting rod, or alternatively, can be incorporated as part of a bearing assembly within the big end of the connecting rod.

I claim:

1. In combination with a piston secured to a connecting rod by a pin, a bearing device fitted between said piston and pin and comprising inner and outer sleeves normally concentrically disposed to one another and defining an annular space therebetween, a resilient insert filling the annular space, an outwardly directed flange on the inner sleeve, an inwardly directed flange on the outer sleeve overlapping and slidable on the outwardly directed flange, said flanges having end edges divided substantially equally into adjacent first portions concentric to a common axes of the sleeves and adjacent second portions diametrically opposed to said first portions and eccentric to said common axes, said inner sleeve in normal position has its said first portion in engagement with said outer sleeve and its second portion radially spaced from said outer sleeve whereby said sleeves have limited relatively radial movement restricted substantially to movement along one path of travel only.

2. The combination as claimed in claim 1, in which said end edge of the outwardly directed flange is beveled to compress the resilient insert axially and cushion the sleeves as said sleeves reach the end of the relative radial movement.

3. The combination as claimed in claim 1, in which said inner and outer sleeves have opposing surfaces roughened to resist relative rotation between said sleeves and the resilient insert.